United States Patent
Lotter et al.

(10) Patent No.: US 10,750,427 B2
(45) Date of Patent: Aug. 18, 2020

(54) INTEGRATED POWER SUPPLY AND ANTENNA FOR REPEATER

(71) Applicant: Nextivity, Inc., San Diego, CA (US)

(72) Inventors: Michiel Petrus Lotter, San Diego, CA (US); Jason Foster Cook, Laguna Niguel, CA (US); Richard Jacques Fortier, San Diego, CA (US); In Kwang Kim, San Diego, CA (US); Ian Riphagen, San Diego, CA (US); James Xiaohui Qiu, Carlsbad, CA (US)

(73) Assignee: NEXTIVITY, INC., San Diego, CA (US)

(*) Notice: Subject to any disclaimer, the term of this patent is extended or adjusted under 35 U.S.C. 154(b) by 0 days.

(21) Appl. No.: 15/092,556

(22) Filed: Apr. 6, 2016

(65) Prior Publication Data

US 2016/0295495 A1 Oct. 6, 2016

Related U.S. Application Data

(60) Provisional application No. 62/143,697, filed on Apr. 6, 2015.

(51) Int. Cl.
| | |
|---|---|
| *H04W 40/22* | (2009.01) |
| *H04W 16/28* | (2009.01) |
| *H04B 7/155* | (2006.01) |
| *H04B 7/14* | (2006.01) |

(52) U.S. Cl.
CPC ........ *H04W 40/22* (2013.01); *H04B 7/15507* (2013.01); *H04W 16/28* (2013.01)

(58) Field of Classification Search
CPC ........................... H04B 7/15507; H04W 40/22
See application file for complete search history.

(56) References Cited

U.S. PATENT DOCUMENTS

| | | | |
|---|---|---|---|
| 6,335,703 B1 * | 1/2002 | Chang | H01Q 3/20 343/700 MS |
| 2008/0267112 A1 | 10/2008 | Lucidarme | |
| 2011/0235536 A1 | 9/2011 | Nishizaka | |
| 2013/0257671 A1 * | 10/2013 | Chen | H04B 15/04 343/841 |

FOREIGN PATENT DOCUMENTS

WO  WO-2007/123733 A2  11/2007

* cited by examiner

*Primary Examiner* — Bo Hui A Zhu
(74) *Attorney, Agent, or Firm* — Kilpatrick Townsend & Stockton LLP

(57) ABSTRACT

A repeater system for relaying wireless communications between a base station and one or more devices having: a repeater to relay network information from a base station to one or more devices; a donor antenna configured to receive and/or transmit network information between the repeater and the base station; a power supply external to the repeater; and, a server antenna integrated with the power supply, the server antenna configured to receive and/or transmit network information between the repeater and the one or more devices.

6 Claims, 2 Drawing Sheets

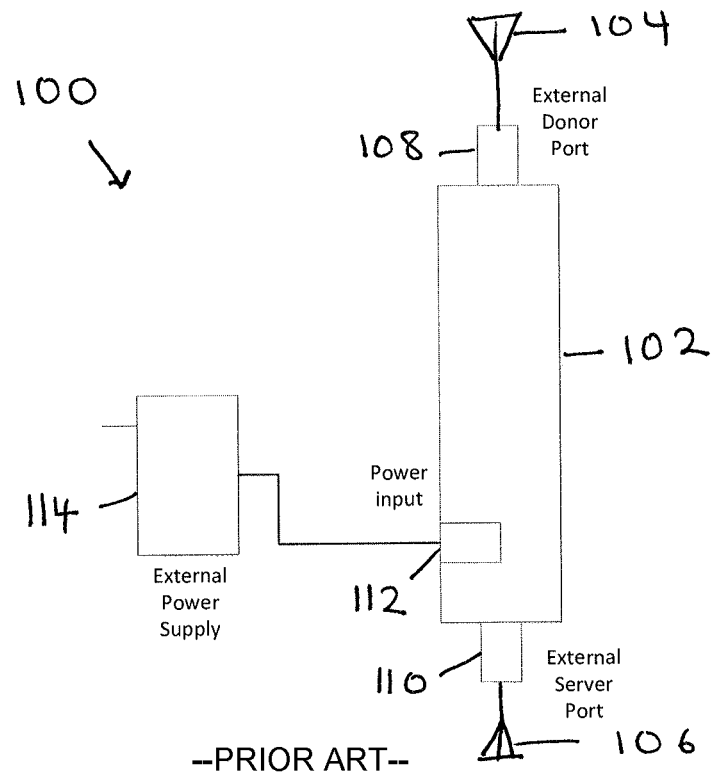
FIG. 1 —PRIOR ART—
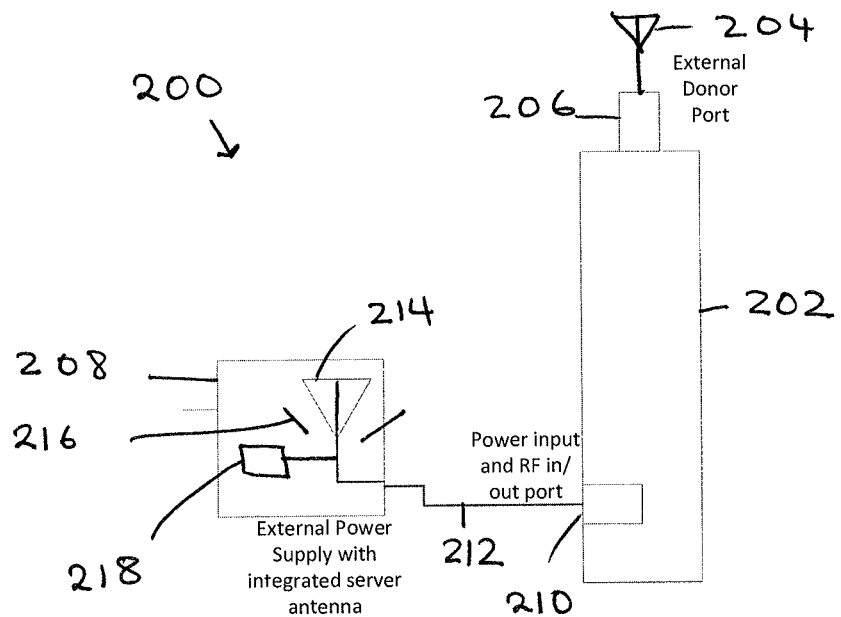
FIG. 2

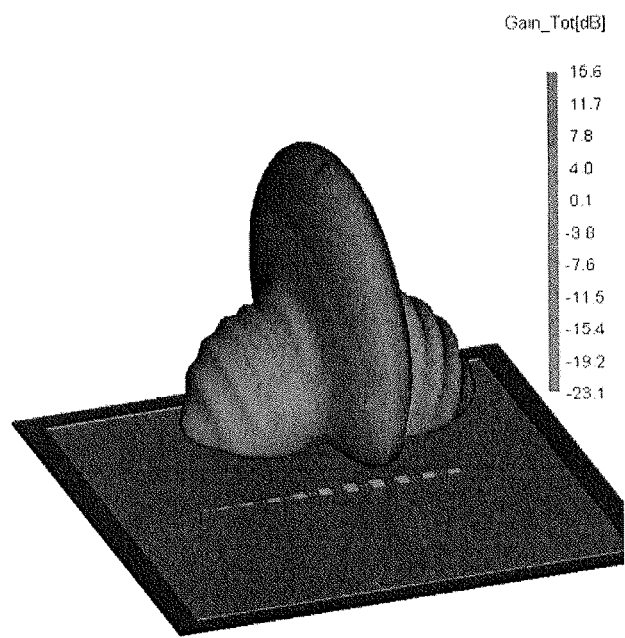
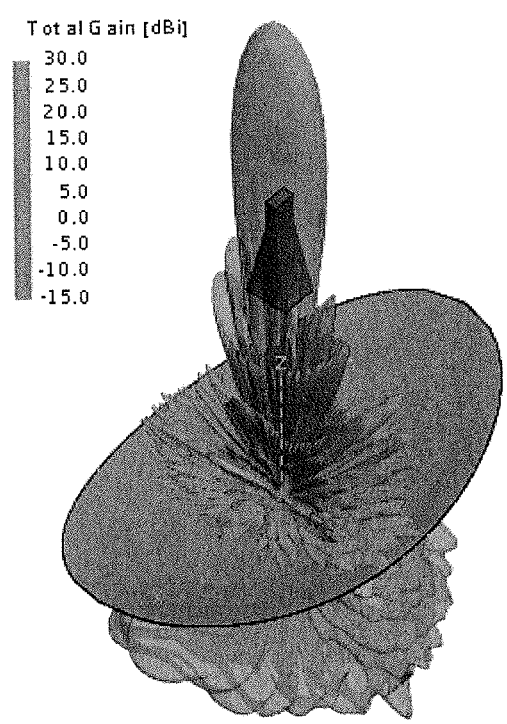
FIG. 3 understand# INTEGRATED POWER SUPPLY AND ANTENNA FOR REPEATER

CROSS-REFERENCE TO RELATED APPLICATION

This application claims priority to and the benefit of U.S. Provisional Patent Application No. 62/143,697, filed on Apr. 6, 2015 and titled "INTEGRATED POWER SUPPLY AND ANTENNA FOR REPEATER," the disclosure of which is incorporated by reference in its entirety.

TECHNICAL FIELD

The subject matter described herein relates generally to the field of wireless communication and data networks. More particularly, in one exemplary embodiment, the disclosure is directed to power delivery systems for network repeaters.

BACKGROUND

The existing cellular networks, such as (Global System for Mobile Communications (GSM) and IS95, are intended to provide a contagious and continuous coverage, so as to support the high terminal mobility expected from such systems. However, despite careful network design, indoor (in-building) coverage, or the coverage of places with high shadowing attenuation (e.g. tunnels) of such networks is often "patchy", with "coverage Holes" at best, and no coverage at worst. The reason for the impaired indoor coverage is that the cellular base stations are usually placed outside buildings, higher than the average building heights, to provide large area coverage. Although the signal may be adequate at "street-level", it is severely attenuated by the building material, reducing the signal power in-building, resulting in the poor converges. Loss of signal power (attenuation) depends on the building material and can be tens of dBs for each wall penetration. The problem is exacerbated in the 3rd generation systems such as Wideband Code Division Multiple Access (WCDMA) and cdma2000, as these new systems have the capability of high data transmission, which results in lower information bit energy (Eb), and much reduced link budget and cell foot-print.

Typical solutions for providing indoor coverage are expensive and involve extensive investment in the cellular network infrastructure and are much more complex in planning and operation. Typical repeater systems contain two antennas, a donor antenna that receives/transmits signals from/to a base station and a server antenna that receives/transmits signals from/to a handset. In typical repeater implementations, the donor and server antennas are either integrated within the repeater, or they are external to the repeater, connecting to the repeater via an RF connector such as a SMA connecter. In addition to the external antenna connections, the repeater also has a power supply input port which is used to supply power from an external source to the repeater.

SUMMARY

In one aspect, the present disclosure is directed toward, a system for relaying network information between a base station and one or more handsets configured to receive network information from the base station. The presently disclosed system for relaying network information, or repeater, may include a donor antenna configured to receive and/or transmit network information between the repeater and the base station.

The repeater may include a power supply external to the donor antenna. The donor antenna may be housed in a donor antenna housing. The power supply may be external to the donor antenna housing. The donor antenna may be adapted to be electronically connected to the power source. For example, the donor antenna may be in electronic communication with an external power supply port. The repeater system may include an electronic link between the power supply and the power supply port. In some implementations, the electronic link may include a plug configured to connect with the external power supply port. The power supply may be configured to provide power to the donor antenna through the electronic link and/or the external power supply port.

The repeater may include a server antenna configured to receive and/or transmit network information between the repeater and the handset. The server antenna may be integrated with the power supply, external to the donor antenna. The power supply may be configured to provide power to the sever antenna.

The electronic link between the power supply and the donor antenna may be configured to transmit network information between the sever antenna and the donor antenna. The electronic link between the power supply and the donor antenna may be configured to carry electronic power from the power supply to the donor antenna.

The presently disclosed repeater system may include a radiation pattern. The repeater system may be configured to increase isolation between the server antenna and the donor antenna to reduce the effect of coupling loss between the server antenna the donor antenna.

The radiation pattern of the presently disclosed repeater system may be configured to provide increased coverage in the space where the repeater is deployed compared to other repeater systems.

The radiation pattern of the presently disclosed repeater system may be configured to provide increased coverage in the space where the repeater is deployed behind objects creating a barrier to the transmission of data signals, such as furniture, compared to other repeater systems.

The power adapter may comprise one or more metal reflectors. The one or more metal reflectors may be configured to steer the radiation pattern of the server antenna integrated into the power adapter. In some implementations, the one or more metal reflectors may be configured to steer the main lobe(s) of the radiation pattern. The radiation pattern may be substantially a vertical disk of radiation.

The power adapter may comprise a controller. The controller may be in electronic communication with the server antenna. The controller may be configured to alter the radiation pattern of the server antenna. The controller may be configured to alter the radiation pattern of the server antenna to increase the performance of the repeater system.

Implementations of the current subject matter can provide one or more advantages. For example, improved isolation between the donor and server antennas. Isolating the donor and server antennas may lead to reduced interference between the network signals transmitted by the donor and server antennas. Reduced interference between signals leads to increased system gain. Increased system gain leads to a larger coverage footprint from the repeater system.

Providing one or more server antennas integrated into the power supply reduces the requirement for installing server antennas. Consequently, installation of a repeater system having one or more aspects of the presently disclosed subject matter may increase the ease at which such repeater systems are installed.

The details of one or more variations of the subject matter described herein are set forth in the accompanying drawings and the description below. Other features and advantages of the subject matter described herein will be apparent from the description and drawings, and from the claims. Certain features of the currently disclosed subject matter are described for illustrative purposes only and it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 is a diagram of an example of a repeater similar to repeaters available in them prior art;

FIG. 2 is a diagram illustrating aspects of a system showing features consistent with implementations of the current subject matter; and FIG. 3 shows illustrations of examples of radiation patterns from antennas of a system showing features consistent with implementations of the current subject matter.

When practical, similar reference numbers denote similar structures, features, or elements.

DETAILED DESCRIPTION

FIG. 1 illustrates an example of a prior art repeater system 100. Prior art repeater system 100 includes a repeater 102. The repeater 102 includes two antennas, a donor antenna 104 that receives/transmits signals from/to a base station and a server antenna 106 that receives/transmits signals from/to a handset. In typical repeater implementations, the donor antenna 104 and the server antenna 106 are either integrated within the repeater, or they are external to the repeater, connecting to the repeater via RF connectors 108, 110, such as a SMA connecter. In addition to the external antenna connections, the repeater also has a power supply input port 112 which is used to supply power from an external source 114 to the repeater 102.

FIG. 2 illustrates a repeater system 200 having one or more features consistent with the present disclosure. The repeater system 200 may be configured to relay network information between a base station and one or more handsets configured to receive network information from the base station. The network information may include network information transmitted over a wireless network. The presently disclosed system 200 for relaying network information, or repeater, may include a repeater 202. The repeater 202 may include donor antenna 204 configured to receive and/or transmit network information between the repeater 202 and the base station (not shown). The donor antenna 204 may be integrated with the repeater 202. The repeater 202 may include a donor antenna port 206 configured to transmit radio frequency signals between the donor antenna 206 and the repeater 202.

The repeater may include a power supply 208 external to the repeater 202 and/or the donor antenna 204. The donor antenna 204 may be adapted to be electronically connected to the power source 208. The donor antenna 204 may be adapted to be electronically connected to the power source 208 through the repeater 202. In some implementations, the donor antenna 204 may not be in electronic communication with the power source 208. The repeater 202 may be in electronic communication with the external power supply 208 trough a power input port 210. The repeater system 200 may include an electronic link 212 between the power supply 208 and the power input port 210. In some implementations, the electronic link 212 may include a plug configured to connect with the external power supply port. The power supply 208 may be configured to provide power to the repeater 202 through the electronic link 212 and/or the power input port 210.

The repeater system 200 may include a server antenna 214. The server antenna 214 may be configured to receive and/or transmit network information between the repeater 202 and one or more handsets (not shown). The server antenna 214 may be integrated with the power supply 208, external to the repeater 202 and/or donor antenna 204. The power supply 208 may be configured to provide power to the sever antenna 214.

The electronic link 212 between the power supply 214 and the repeater 202 may be configured to transmit network information between the sever antenna 214 and the repeater 202. The electronic link 212 may be configured to transmit network information between the server antenna 214 and the donor antenna 204. The electronic link 212 between the power supply 208 and the repeater 202 may be configured to carry electronic power from the power supply 208 to the repeater 202. Similarly, in some implementations, power may be carried to the donor antenna 204.

The presently disclosed repeater system 200 may include a radiation pattern. The repeater system 200 may be configured to increase isolation between the server antenna 214 and the donor antenna 204 to reduce the effect of coupling loss between the server antenna 214 the donor antenna 204.

The radiation pattern of the presently disclosed repeater system 200 may be configured to provide increased coverage in the space where the repeater is deployed compared to other repeater systems, such as repeater system 100.

The radiation pattern of the presently disclosed repeater system 200 may be configured to provide increased coverage in the space where the repeater 202 is deployed behind objects creating a barrier to the transmission of data signals, such as furniture, compared to other repeater systems, such as repeater system 100.

The power supply 208 may comprise one or more metal reflectors 216. The one or more metal reflectors 216 may be configured to steer the radiation pattern of the server antenna 214 integrated into the power supply 208. In some implementations, the one or more metal reflectors 216 may be configured to steer the main lobe(s) of the radiation pattern. The radiation pattern may be substantially a vertical disk of radiation. FIG. 3 shows examples of radiation patterns.

The power supply 208 may comprise a controller 218. The controller 218 may be in electronic communication with the server antenna 214. The controller 218 may be configured to alter the radiation pattern of the server antenna 214. The controller 218 may be configured to alter the radiation pattern of the server antenna 214 to increase the performance of the repeater system 200.

Implementations of the current subject matter can provide one or more advantages. For example, improved isolation between the donor antenna 204 and server antenna 214. Isolating the donor and server antennas may lead to reduced interference between the network signals transmitted by the donor and server antennas. Reduced interference between signals leads to increased system gain. Increased system gain leads to a larger coverage footprint from the repeater system 200.

Providing one or more server antennas 214 integrated into the power supply 208 reduces the requirement for installing server antennas onto the repeater 202. Consequently, the ease of installation of a repeater system 200 having one or more aspects of the presently disclosed subject matter may be increased.

Configuring the radiation pattern of the server antenna 214 may be accomplished using one or more computer program instructions executed by one or more computer processors. One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A repeater system for relaying wireless communications between a base station and one or more devices, the repeater system comprising:
    a repeater configured to relay network information between the base station and the one or more devices, the repeater having a power input port;
    a donor antenna integrated with the repeater and configured to receive and/or transmit network information between the repeater and the base station;
    a power supply external to and spaced apart from the repeater by a distance, the power supply being connected with the power input port of the repeater via an electronic link that carries both electric power from the power supply and network information from the donor antenna; and
    a server antenna external to and spaced apart from the repeater, and integrated with the power supply, the server antenna configured to receive and/or transmit network information between the repeater and the one or more devices, wherein positioning of the server antenna external to the repeater by at least the distance allows for isolation between the donor antenna and the server antenna thereby reducing signal interference of the received and/or transmitted network information.

2. The repeater system of claim 1, wherein the server antenna is configured to increase isolation between the server antenna and the donor antenna to reduce the effect of coupling loss between the server antenna and the donor antenna.

3. The repeater system of claim 1, wherein the server antenna is configured to provide increased coverage in the space where the repeater is deployed.

4. The repeater system of claim 1, wherein the server antenna has a radiation pattern that is configured to provide increased coverage in the space where the repeater is deployed.

5. The repeater system of claim 4, wherein the power supply has one or more metal reflectors configured to steer the radiation pattern of the server antenna.

6. The repeater system of claim 4, wherein the power supply has a controller in electronic communication with the server antenna, the controller configured to alter the radiation pattern of the server antenna.

* * * * *